(12) United States Patent
Itoh et al.

(10) Patent No.: US 6,383,112 B1
(45) Date of Patent: May 7, 2002

(54) TOROIDAL-TYPE CONTINUOUSLY VARIABLE TRANSMISSION

(75) Inventors: Hiroyuki Itoh; Nobuo Goto; Makoto Fujinami; Takashi Imanishi; Hiroshi Kato, all of Kanagawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 09/418,995

(22) Filed: Oct. 14, 1999

(51) Int. Cl.$^7$ ................................................ F16H 15/38
(52) U.S. Cl. .............................. 476/40; 476/42; 476/45
(58) Field of Search .............................. 476/40, 42, 45; 148/211, 226

(56) References Cited

U.S. PATENT DOCUMENTS

| | | | |
|---|---|---|---|
| 4,656,723 A | * | 4/1987 | Uchida ........................ 148/226 |
| 5,299,988 A | * | 4/1994 | Fukushima et al. ............ 476/42 |
| 5,584,778 A | * | 12/1996 | Machida et al. ............... 476/40 |
| 5,651,750 A | * | 7/1997 | Imanishi et al. ............... 476/40 |

FOREIGN PATENT DOCUMENTS

| | | | |
|---|---|---|---|
| JP | 9-42400 | 2/1997 | ............ F16H/15/38 |
| JP | 9-88988 | 3/1997 | ............. F16D/1/02 |

OTHER PUBLICATIONS

Machine Design, Theory and Practice, Macmillian Publishing Co., Inc. 1975, isbn 0-02-329000-5, p. 222.*

* cited by examiner

Primary Examiner—David Fenstermacher
Assistant Examiner—William C. Joyce
(74) Attorney, Agent, or Firm—Sughrue Mion, PLLC

(57) ABSTRACT

In the toroidal-type continuously variable transmission, the torque transmission shaft 15 includes a flange portion 29*a* formed in one end thereof, while a securing portion 43 is formed in the end-face side half section of the flange portion 29*a* so as to be able to secure a tool thereto when tightly fastening a loading nut 19 to a external thread portion 40 formed in the torque transmission shaft 15. And, the outer peripheral surface of the securing portion 43 is formed as a polygonally cylindrical shape having four or more flat surfaces. Also, after the torque transmission shaft 15 is heat-carburized and the surface of a cylindrical portion 44 formed in the torque transmission shaft 15 is removed, the external thread portion 40 is worked, which makes it possible not only to secure the hardness of the adjoining portions of the external thread portion 40 but also to control the hardness of the external thread portion 40 itself. Further, branch oil supply passages 39 and 39 used to supply oil to ball splines 17 and 17 are formed at the positions of the torque transmission shaft 15 that are shifted in the axial direction of the torque transmission shaft 15 from the positions of balls 37, 37, which respectively construct the ball splines 17 and 17.

8 Claims, 10 Drawing Sheets

PRIOR ART

PRIOR ART

PRIOR ART

PRIOR ART

TOROIDAL-TYPE CONTINUOUSLY VARIABLE TRANSMISSION

BACKGROUND OF THE INVENTION

1. Field of the Invention

The present invention relates to a toroidal-type continuously variable transmission which can be used as a car transmission or the like.

2. Description of the Related Art

Conventionally, it has been studied to use as a car transmission such a toroidal-type continuously variable transmission as shown in FIGS. 10 and 11. In this toroidal-type continuously variable transmission, an input-side disk 2 is supported concentrically with an input shaft 1 which is rotatably supported in the inside of a transmission case (not shown), while an output-side disk 4 is fixed to the end portion of an output shaft 3 which is also supported rotatable with respect to the transmission case. On the inner surface of the transmission case with the toroidal-type continuously variable transmission stored therein, or on a support bracket disposed within the transmission case, there are disposed two trunnions 5 and 5 which can be respectively swung about their associated pivot shafts respectively situated at positions along an imaginary plane that is perpendicular to an imaginary line connecting the respective axes of the input and output shafts 1 and 3, and distanced from the intersection of the imaginary plane and imaginary line. This physical relation is hereinafter referred to as "torsional relation".

The two trunnions 5 and 5 are respectively formed of highly rigid metal material, while the above pivot shafts are respectively disposed on the outer surfaces of the two ends of the rigid metal trunnions 5 and 5 in such a manner that they extend concentrically with each other in the front-and-back direction of FIGS. 10 and 11. Also, in the peripheries of displacement shafts 6 and 6 which are respectively disposed in the central portions of the two trunnions 5 and 5, there are rotatably supported power rollers 7 and 7, respectively. And, these power rollers 7 and 7 are interposed between the input-side and output-side disks 2 and 4. On the respective one-side surfaces of the input-side and output-side disks 2 and 4 in the respective axial directions thereof, there are formed an input-side concave surface 2a and an output-side concave surface 4a each of which has an arc-shaped cross section with a point on its associated pivot shaft as a center thereof. And, the peripheral surfaces 7a and 7a of the power rollers 7 and 7, which are respectively formed in rotation-arc-shaped convex surfaces, are contacted with the input-side concave surface 2a and output-side concave surface 4a, respectively.

Also, between the input shaft 1 and input-side disk 2, there is interposed a pressure device 8 of a loading cam type, while the pressure device 8 pushes the input-side disk 2 toward the output-side disk 4. The pressure device 8 is composed of a cam plate 9 rotatable together with the input shaft 1, and a plurality of (for example, 4 pieces of) rollers 11, 11, —which are rotatably held by a retainer 10. On one side surface (in FIGS. 10 and 11, the right side surface) of the cam plate 9, there is formed a cam surface 12 which is a curved surface extending in the circumferential direction of the cam plate 9; and, at the same time, on the outer surface (in FIGS. 10 and 11, the left side surface) of the input-side disk 2 as well, there is formed a similar cam surface 13. And, the plurality of rollers 11, 11, . . . are freely rotatable about their respective shafts extending radially with respect to the center of the input shaft 1. By the way, the input-side disk 2 is supported in such a manner that it can be slided to a slight degree in the axial direction of the input shaft 1 as well as it can be rotated in the rotation direction of the input shaft 1.

If the cam plate 9 is rotated with the rotation of the input shaft 1 to thereby produce a rotation phase difference with respect to the input-side disk 2, then the plurality of rollers 11, 11, —are caused to run up onto the two cam surfaces 12 and 13, thereby causing the cam plate 9 and input-side disk 2 to move away from each other. Since the cam plate 9 is supported on the input shaft 1 carried on the transmission case by a bearing in such a manner that the cam plate 9 is prevented from moving in the axial direction of the input shaft 1, the input-side disk 2 is pushed toward the power rollers 7 and 7, so that the power rollers 7 and 7 are respectively pushed toward the output-side disk 4. On the other hand, the output-side disk 4 is supported to the transmission case in such a manner that it can be only rotated together with the output shaft 3 but is prevented against movement in the axial direction of the output shaft 3. Therefore, the power rollers 7 and 7 are strongly interposed between the input-side disk 2 and output-side disk 4. This increases the mutual contact pressures between the peripheral surfaces 7a, 7a of the power rollers 7, 7 and the two input-side and output-side concave surfaces 2a, 4a to a sufficient degree, so that the rotation of the input-side disk 2 can be transmitted to the output-side disk 4 through the power rollers 7, 7 with little slippage and thus the output shaft 3 with the output-side disk 4 fixed thereto can be rotated.

In changing the rotation speed ratio between the input shaft 1 and output shaft 3, at first, to decelerate the rotation speed between the input shaft 1 and output shaft 3, as shown in FIG. 10, the trunnions 5 and 5 are respectively swung in a given direction about their respective pivot shafts to incline the displacement shafts 6 and 6 in such a manner that the peripheral surfaces 7a and 7a of the rollers 7 and 7 can be respectively contacted with the portion of the input-side concave surface 2a located near the center portion thereof and the portion of the output-side concave surface 4a located near the outer periphery thereof. On the other hand, to accelerate the rotation speed between the input shaft 1 and output shaft 3, as shown in FIG. 11, the trunnions 5 and 5 are respectively swung in the opposite direction to the above direction to incline the displacement shafts 6 and 6 in such a manner that the peripheral surfaces 7a and 7a of the rollers 7 and 7 can be respectively contacted with the portion of the input-side concave surface 2a located near the outer periphery thereof and the portion of the output-side concave surface 4a located near the center thereof. Also, if the inclination angles of the displacement shafts 6 and 6 are respectively set in the middle of the angles shown in FIGS. 10 and 11, then there can be obtained an intermediate gear ratio between the input shaft 1 and output shaft 3.

The basic structure and operation of the toroidal-type continuously variable transmission are as described above. By the way, when using such toroidal-type continuously variable transmission as a transmission for a car including a large output engine, in order to be able to secure the power that can be transmitted, there is employed a structure in which the input-side disks 2 and output-side disks 4 are disposed by twos. In this toroidal-type continuously variable transmission of a so called double-cavity type, the two input-side disks 2 and two output-side disks 4 are respectively arranged in parallel to each other with respect to the transmission direction of the power. FIG. 12 shows an example of a toroidal-type continuously variable transmission of a double-cavity type which has been proposed for the above object.

In the conventional structure shown in FIG. 12, a torque transmission shaft 15, which is a rotary shaft, is supported inside a housing 14 in such a manner that it can be only rotated. And, the torque transmission shaft 15 can be freely driven or rotated by a drive shaft 16 which is connected to the output shaft of a clutch or the like. Also, on the axial-direction two end portions of the torque transmission shaft 15, there are supported a pair of input-side disks 2 and 2 through ball splines 17 and 17 in such a manner that the input-side concave surfaces 2a and 2a of the two input-side disks 2 and 2 are opposed to each other. Therefore, the input-side disks 2 and 2 are respectively supported on the axial-direction two end portions of the torque transmission shaft 15 in such a manner that they can be freely rotated in synchronization with the torque transmission shaft 15 as well as can be freely shifted in the axial direction of the torque transmission shaft 15. Also, on the respective central portions of the back surfaces (the axial-direction opposite surfaces to the input-side convex surfaces 2a and 2a) of the input-side disks 2 and 2, there are formed recessed portions 18 and 18. And, between the deep-side surfaces of the two recessed portions 18, 18 and a loading nut 19 or a securing stepped portion 20 formed in the outer peripheral surface of the torque transmission shaft 15 that is situated near one end (in FIG. 12, the left end) thereof, there are interposed belleville springs 21a and 21b respectively. The two belleville springs 21a and 21b respectively give preloads which are directed toward output-side disks 4 and 4 (which will be discussed next) to the input-side disks 2 and 2. By the way, the elasticity of the belleville spring 21a disposed on the loading nut 19 side is set sufficiently large to thereby substantially prevent the input-side disk 2 opposed to the loading nut 19 from moving in the axial direction thereof.

On the periphery of the intermediate portion of the torque transmission shaft 15, there are supported a pair of output-side disks 4 and 4 in such a manner that they can be freely rotated with respect to the torque transmission shaft 15 while their respective output-side concave surfaces 4a and 4a are opposed to the above-mentioned input-side concave surfaces 2a and 2a. Also, between the mutually opposed input-side and output-side concave surfaces 2a and 4a, there are respectively interposed a plurality of power rollers 7, 7, —(see FIGS. 10 and 11. However, they cannot be seen in FIG. 12, because they are respectively located on the front and back sides of the present toroidal-type continuously variable transmission) which are rotatably supported to the plurality of trunnions 5, 5, —via the displacement shaft 6, 6, —Further, within the housing 14, there is interposed a partition wall 22 between the pair of output-side disks 4 and 4. And, in the inside portion of a through hole 23 formed in the partition wall 22, there is supported a circular-pipe-shaped sleeve 25 by a pair of rolling bearings 24 and 24 which are respectively angular contact ball bearings. The pair of output-side disks 4 and 4 are respectively spline engaged with the two end portions of the sleeve 25 in such a manner that they can be freely rotated together with the sleeve 25. Also, in the intermediate portion of the sleeve 25 and in the inside portion of the partition wall 22, there is fixedly disposed an output gear 26. On the other hand, inside the housing 14, there is rotatably supported an output shaft 27 in parallel to the torque transmission shaft 15. And, a gear 28 fixed to one end (in FIG. 12, the left end) of the output shaft 27 is meshingly engaged with the output gear 26, whereby the rotational movements of the pair of output-side disks 4 and 4 can be taken out freely. Further, between the drive shaft 16 and one (in FIG. 12, left side) input-side disk 2, there is interposed a pressure device 8 of a loading cam type: that is, with the rotation of the drive shaft 16, one input-side disk 2 can be freely driven or rotated while the pressure device 8 is pressing one input-side disk 2 in the axial direction thereof toward its associated output-side disk 4.

Also, on the outer peripheral surface of one end portion of the torque transmission shaft 15, there is formed a flange portion 29 in such a manner that the flange portion 29 is integrally formed with the torque transmission shaft 15. And, between the flange portion 29 and the portion of the outside surface of the cam plate 9 located near the inner periphery thereof, there is interposed a thrust ball bearing 30 of an angular contact type. The thrust ball bearing 30, when the pressure device 8 is in operation, not only allows the mutual displacement between the cam plate 9 forming the pressure device 8 and the torque transmission shaft 15 in the rotation direction thereof, but also supports a thrust load to be applied to the cam plate 9. In order to form such thrust ball bearing 30, an inner race raceway 31 is directly formed on the inside surface (located near the center portion of the torque transmission shaft 15, that is, in FIG. 12, the right-side surface) of the flange portion 29, and an outer race raceway 32 is directly formed in the portion of the outside surface of the cam plate 9 located near the inner periphery thereof, respectively. And, a plurality of balls 33, 33 are rollingly held between the inner race raceway 31 and outer race raceway 32, thereby forming the thrust ball bearing 30. On the outer peripheral surface of the end-face side half section (the half section located near the end portion of the torque transmission shaft 15, that is, in FIG. 12, the left half section) of the flange portion 29, as shown in FIGS. 13 and 14, there are formed a pair of mutually parallel flat surfaces 34 and 34. These flat surfaces 34 and 34, when fastening the loading nut 19 tightly, secure a tool such as a spanner or the like to thereby prevent the rotation of the torque transmission shaft 15.

Further, in order to form the ball splines 17 and 17 which are used to support the pair of input-side disks 2 and 2 on the portions of the torque transmission shaft 15 located near the both ends thereof, two outer-peripheral-surface side spline grooves 35 and 35 are respectively formed in the portions of the outer periphery surface of the torque transmission shaft 15 located near the both ends thereof, and two inner-peripheral-surface side spline grooves 36 and 36 are respectively formed in the inner peripheral surfaces of the input-side disks 2 and 2. And, between the respective outer-peripheral-surface side spline grooves 35 and inner-peripheral-surface side spline grooves 36, there are interposed a plurality of balls 37, 37, —, thereby forming the respective ball splines 17 and 17. Also, the torque transmission shaft 15 includes, in the central portion thereof, an oil supply passage 38 which is shaped in the form of a hollow pipe. And, as shown in FIGS. 12 and 15, two branch oil supply passages 39 and 39 respectively branch off from the oil supply passage 38 in the diameter direction of the cross section of the torque transmission shaft 15, and the respective downstream ends of the two branch oil supply passages 39 and 39 are opened to the bottom portions of the outer-peripheral-surface side spline grooves 35 and 35. Thus, when the present toroidal-type continuously variable transmission is in operation, lubrication oil (traction oil), which is supplied into the oil supply passage 38 by an oil supply pump (not shown), is discharged from the branch oil supply passages 39 and 39 into the outer-peripheral-surface side spline grooves 35 and 35 to thereby lubricate the respective ball splines 17 and 17.

In the above-structured toroidal-type continuously variable transmission, in conjunction with the rotation of the drive shaft 16, the pair of input-side disks 2 and 2, which are respectively supported on the both end portions of the torque transmission shaft 15 through their associated ball splines 17 and 17, are rotated at the same time. And, the rotational movements of them are transmitted to the pair of output-side disks 4 and 4 at the same time and, further, the thus transmitted rotation is then transmitted from the output-side disks 4 and 4 to the output shaft 27, so that the rotation is finally taken out from the output shaft 27. In this operation, since the transmission of the rotational force is carried out by two mutually parallel systems, there can be freely transmitted a large power (torque).

When the power is transmitted from the drive shaft 16 to the output shaft 27, due to the large thrust load generated by the pressure device 8, the input-side and output-side disks 2 and 4 as well as the power rollers 7, 7 interposed between these disks 2 and 4 (see FIGS. 10 and 11) are elastically deformed, respectively. This elastic deformation is absorbed by the axial displacement of the respective input-side disks 2 and 2 with respect to the torque transmission shaft 15. Since the input-side disks 2 and 2 are respectively supported on the torque transmission shaft 15 in such a manner that they can be freely displaced in the axial direction of the torque transmission shaft 15 by their associated ball splines 17 and 17, the absorption of the elastic deformation can be carried out smoothly. Also, because the displacement shafts 6 and 6 (see FIGS. 10 and 11), which are respectively eccentric shafts, pivotally supporting their associated power rollers 7 and 7 are respectively swung about the circular holes (not shown) respectively formed in their associated trunnions 5 and 5, the power rollers 7 and 7 are also displaced in the axial direction of the torque transmission shaft 15 to thereby absorb the above elastic deformation. By the way, since such absorption of the elastic deformation due to the swinging displacement of the displacement shafts 6 and 6 is conventionally known well and does not relate to the characteristic portion of the present invention, the detailed illustration and description thereof are omitted here.

However, in the conventional toroidal-type continuously variable transmission which is structured and operated in the above-mentioned manner, for the following reasons (1) to (3), it is difficult to secure the durability of the torque transmission shaft 15. That is:

(1) Existence of the pair of flat surfaces 34 and 34 formed in the outer peripheral surface of the end-face side half section of the flange portion 29 makes it difficult to secure the durability of the flange portion 29.

(2) It is difficult to secure the hardness of the portion of the torque transmission shaft 15 adjacent to the external thread portion thereof with which the loading nut 19 is to be threadedly engaged. This raises a possibility that, in the torque transmission shaft 15, there can occur damage such as crack or the like at and from the portion adjacent to the external thread portion.

(3) Since the torque transmission shaft 15 includes the branch oil supply passages 39 and 39 with the downstream ends thereof respectively opened to the bottom portions of the outer-peripheral-surface side spline grooves 35 and 35 of the torque transmission shaft 15, these portions are lowered in the torsional rigidity thereof. Due to the lowered torsional rigidity, there arises a possibility that there can be caused damage such as crack or the like at and from the portions of the branch oil supply passages 39 and 39 of the torque transmission shaft 15.

Now, description will be given below in detail of the respective reasons (1) to (3).

Reason (1)

The flat surfaces 34 and 34, as described above, when fastening the loading nut 19 tightly, are used to secure a tool such as a spanner or the like to thereby prevent the rotation of the torque transmission shaft 15. However, actually, the fastening torque of the loading nut 19 is large, that is, equal to or more than 20 kgf·m. For this reason, the sufficient length $L_{34}$ (FIG. 13) and width $W_{34}$ (FIG. 14) of the flat surfaces 34 and 34 must be secured in order to be able to obtain wide engaging areas between the flat surfaces 34 and tool.

On the other hand, on the inner surface of the flange portion 29 where the flat surfaces 34 and 34 are formed, there is formed the inner race raceway 31 which is used to form the thrust ball bearing 30. The contact angle of the thrust ball bearing 30, which is a ball bearing of an angular contact type, as shown by a chained line a in FIG. 14, is inclined toward the center axis of the flange portion 29 as it approaches the outer end face of the flange portion 29. Therefore, if the length $L_{34}$ and width $W_34$ of the flat surfaces 34 and 34 are set large, then the chained line a passes through the central portions of the flat surfaces 34 and 34 in the longitudinal directions thereof.

In this state, the operation line (which coincides with the chained line α) of the thrust load to be applied to the flange portion 29 through the balls 33, 33 from the cam plate 9 passes through the decreased thickness portion of the flange portion 29 that is caused by the formation of the flat surfaces 34 and 34. In this case, the rigidity of the portion of the flange portion 29 supporting the above thrust load is reduced, which makes it difficult to secure the required durability of the torque transmission shaft 15 including the flange portion 29. If the thickness of the flange portion 29 is increased, then the above operation line is prevented from passing through the decreased thickness portion of the flange portion 29, thereby being able to secure the required durability of the torque transmission shaft 15 including the flange portion 29. However, the increased thickness of the flange portion 29 increases the sizes and weights of the torque transmission shaft 15 and the toroidal-type continuously variable transmission with the present torque transmission shaft 15 incorporated therein. That is, the increased thickness of the flange portion 29 gives rise to an unfavorable problem.

Reason (2)

When forming the external thread portion 40 in the portion of the outer peripheral surface of the torque transmission shaft 15 located near the other end portion thereof for threaded engagement with the loading nut 19, the surface hardness of the external thread portion 40 must be set in such a manner that it is not excessively high. The reason for this is that, if the hardness of the ridge portion of the external thread portion 40 is too high, then there is a fear that there can occur delayed fracture in the external thread portion 40 and, therefore, in order to avoid such delayed fracture, the hardness of the external thread portion 40 must be restrained to the range of HRc20–46. On the other hand, the hardness of the other portions of the surface of the torque transmission shaft 15 than the external thread portion 40 must be set high in order to be able to secure the wear resistance and various strength thereof. For this purpose, after the external thread portion 40 is worked, the surface of the torque transmission shaft 15 is heat-carburized to thereby increase the hardness thereof. And, in the heat carburizing treatment, an anti-carburizing agent is applied to the surface of the external thread portion 40 to thereby prevent the hardness of the external thread portion 40 from becoming excessively high.

Also, on the portion of the torque transmission shaft 15 that is nearer to the central portion thereof than the external thread portion 40, there is formed a stepped surface 41 which extends perpendicularly to the axial direction of the torque transmission shaft 15, in order to bring the inner end face of the loading nut 19 into contact with the stepped surface 41 to thereby position the loading nut 19 in the axial direction of the torque transmission shaft 15. And, the inner peripheral edge of the stepped surface 41 is made to be connected continuously with the end portion of the external thread portion 40 by a curved surface 42 having an arc-shaped section. When the toroidal-type continuously variable transmission is in operation, onto the curved surface 42, there is applied a large tensile stress due to the thrust that is generated by the pressure device 8. In order to prevent the curved surface 42 from being broken in spite of such large tensile stress, it is necessary that the surface hardness of the curved surface 42 is equal to or higher than HRc50.

However, because the curved surface 42 is situated near the end portion of the external thread portion 40, the anti-carburizing agent applied to the external thread portion 40 is easy to stick to the curved surface 42 and, if the anti-carburizing agent sticks to the curved surface 42, then the hardness of the curved surface 42 is lowered down to an insufficient value, which raises a possibility that, in the torque transmission shaft 15, there can occur damage such as crack or the like at and from the curved surface 42 due to the above-mentioned tensile stress.

Also, conventionally, there is known another method in which, prior to working the shape of the external thread portion 40, the torque transmission shaft 15 is heat-carburized to thereby enhance the hardness of the surface of the torque transmission shaft 15; next, the external thread forming portion of the torque transmission shaft 15 is heated again by induction heat treatment and is further annealed to thereby lower the hardness of the external thread forming portion; and, after then, the external thread forming portion is worked into the external thread portion 40.

However, in this conventional method, it is difficult to control the heating area corresponding to the external thread forming portion in the high-frequency heat treatment. That is, there is a fear that even the portion of the torque transmission shaft 15 requiring strength can also be annealed to thereby lower the hardness of such portion.

Reason (3)

A portion of the torque transmission shaft 15, where the outer-peripheral-surface side spline grooves 35 and 35 are formed, receives a large stress in a twisting direction from the balls 37, 37 that respectively form the ball splines 17 and 17. When the branch oil supply passages 39 and 39 are formed in such large stress receiving portion of the torque transmission shaft 15 and thus the cross-sectional area of this portion is reduced by an amount corresponding to the formation of the branch oil supply passages 39 and 39, then the twisting rigidity of this portion is lowered accordingly. Thus, there arises a possibility that, in the torque transmission shaft 15, there can occur damage such as crack or the like at and from the branch oil supply passages 39 and 39 portion thereof. If the diameter of the torque transmission shaft 15 is increased, then the above-mentioned twisting rigidity can be enhanced and thus the required durability of the torque transmission shaft 15 can be secured positively. However, it is not desirable to increase the diameter of the torque transmission shaft 15, because the increased diameter of the torque transmission shaft 15 causes the present torque transmission shaft 15 as well as the toroidal-type continuously variable transmission incorporating the present torque transmission shaft 15 therein to increase in size and weight. This provides another unfavorable problem.

SUMMARY OF THE INVENTION

The present invention aims at eliminating all or part of the above-mentioned reasons (1) to (3) found in the conventional toroidal-type continuously variable transmission. Accordingly, it is an object of the invention to provide a toroidal-type continuously variable transmission which can secure the durability of the torque transmission shaft 15 without causing the torque transmission shaft 15 as well as toroidal-type continuously variable transmission to increase in weight and size.

In attaining the above object, according to the invention, there are provided several toroidal-type continuously variable transmissions. Either of them includes: a rotary shaft; at least one input-side disk disposed on the periphery of said rotary shaft in such a manner that it is unrotatable with respect to the rotary shaft but is shiftable in the axial direction of the rotary shaft, the input-side disk including an inside surface having a cross section formed in an arc-shaped concave surface; at least one output-side disk supported on the rotary shaft in such a manner that it is rotatable with respect to the rotary shaft and shiftable in the axial direction of the rotary shaft, the output-side disk including an inside surface having a cross section formed in an arc-shaped concave surface; a flange portion provided in one end portion of the rotary shaft in such a manner it is formed integrally with the rotary shaft; a cam plate rotatable together with the rotary shaft via an angular-type thrust ball bearing disposed in the portion of the rotary shaft located near one end thereof and between the flange portion and the cam plate; a pressure device including the cam plate and interposed between the flange portion and input-side disk for pressing the input-side disk in a direction in which the input-side disk moves away from the cam plate along the axial direction of the rotary shaft; a loading nut threadedly engageable with the portion of the rotary shaft located near the other end portion thereof for restricting mutual shift between the rotary shaft and input-side disk in the axial direction of the rotary shaft; a trunnion swingable about a pivot shaft situated at a torsional relation with respect to the rotary shaft; a plurality of power rollers respectively interposed between the input-side and output-side disks and supported rotatably on a displacement shaft supported by the trunnion, each of the power rollers including a peripheral surface formed in a spherical-shaped convex surface.

Especially, the inner race raceway of the thrust ball bearing is directly formed on the inside surface of the flange portion and, between the inner race raceway and an outer race raceway formed on the cam plate side, there are rollingly held a plurality of balls, whereby the thrust ball bearing is structured. And, the end-face-side half section of the flange portion is formed as a securing portion including an outer peripheral surface of a polygonal cylindrical shape having four or more surfaces, thereby eliminating a possibility that a decreased thickness portion caused by the formation of the securing portion can be present in the direction of the operation line of a load to be applied to the plurality of balls forming the thrust ball bearing.

Also, a external thread portion for threaded engagement with the loading nut is formed on the outer peripheral surface of the rotary shaft located near the other end thereof in the following manner: that is, a cylindrical portion formed in the portion of the rotary shaft located near the other end thereof and having a larger diameter than the outside diameter of the external thread portion is heat-treated together with the remaining portions of the rotary shaft and, next, the surface of the thus treated cylindrical portion is cut off slightly; and, after then, the external thread portion is formed in the thus treated cylindrical portion.

Further, the input-side disk is supported on the outer peripheral surface of the rotary shaft located near the end thereof by a ball spline in such a manner that the input-side disk can be rotated in synchronization with the rotary shaft as well as can be freely shifted in the axial direction of the rotary shaft. Also, the rotary shaft is shaped in the form of a hollow pipe and includes an oil supply passage in the central portion thereof. Further, the downstream side end of a branch oil supply passage, which is used to communicate the oil supply passage with an outer-peripheral-surface side ball spline groove formed on the outer peripheral surface of the rotary shaft, is opened to the bottom portion of the outer-peripheral-surface side ball spline groove. And, the branch oil supply passage is formed in the end portion of the outer-peripheral-surface side ball spline groove at a position thereof that is not opposed to the balls constructing the ball spline.

According to the above-structured toroidal-type continuously variable transmission according to the invention, the durability of the rotary shaft can be enhanced, so that a toroidal-type continuously variable transmission incorporating the present rotary shaft therein can be enhanced in the durability thereof.

At first, the operation line of the thrust load to be applied to the flange portion from the balls of the thrust ball bearing is prevented from passing through the decreased thickness portion of the flange portion, which can make it difficult to cause damage such as crack or the like in the flange portion.

Secondly, the required hardness of the adjacent portion to the external thread portion for threaded engagement with the loading nut can be secured, thereby being able to prevent occurrence of damage such as crack or the like in the adjacent portion. This also makes it possible to lower the hardness of the external thread portion.

Thirdly, a portion of the rotary shaft, where there is formed the outer-peripheral-surface side ball spline groove for constructing the ball spline, is allowed to have a required cross section area, thereby being able not only to enhance the torsional rigidity of the portion but also to prevent stresses from being concentrated on the portion. This makes it possible to prevent occurrence of damage such as crack or the like in the present portion.

DETAILED DESCRIPTION OF THE PREFERRED EMBODIMENTS

Figure 1:
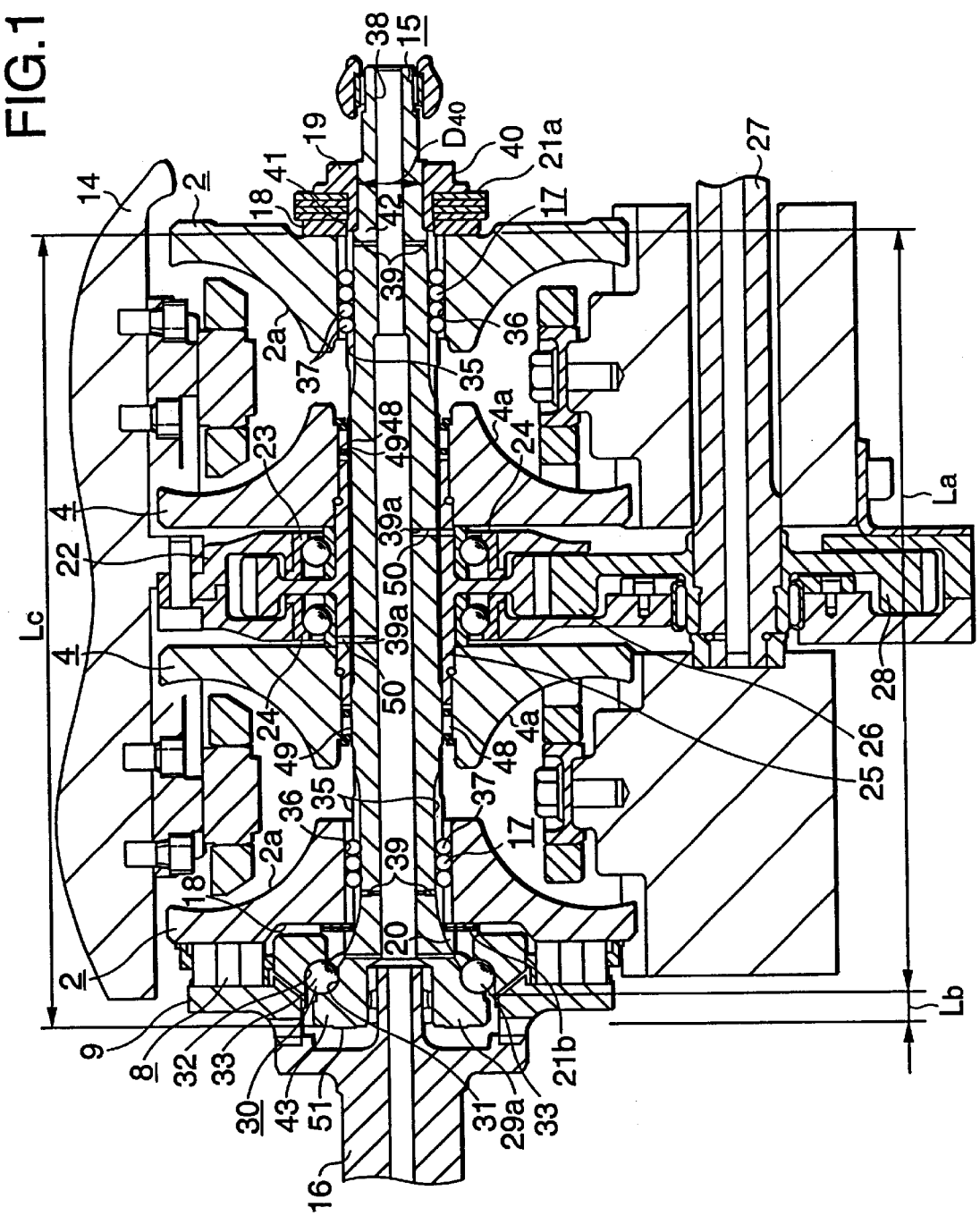
FIG. 1 is a section view of a first embodiment of a toroidal-type continuously variable transmission according to the invention.
Figure 2:
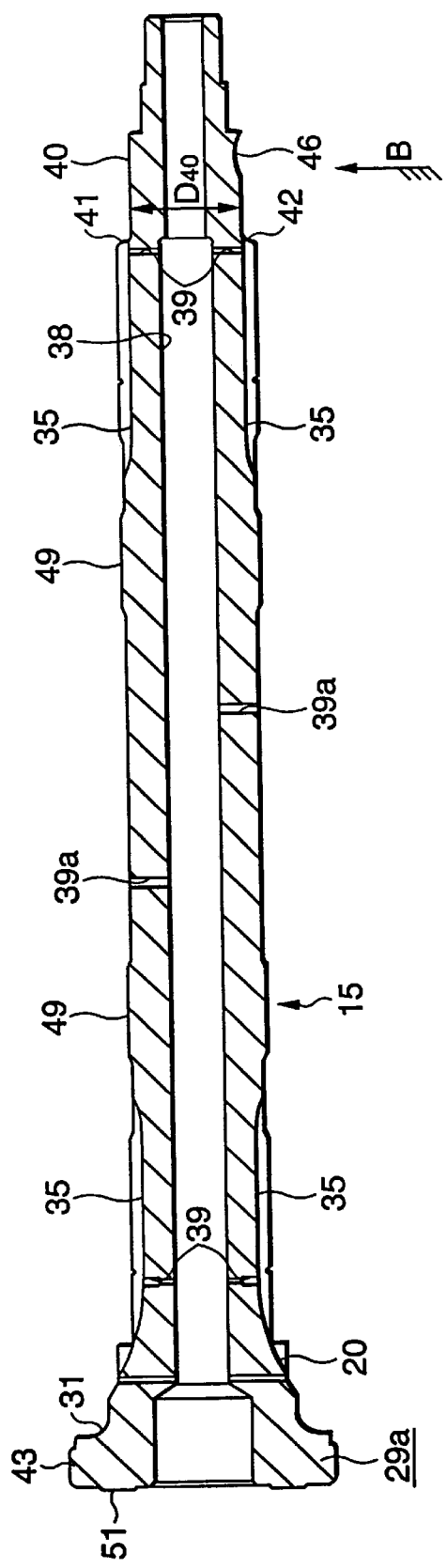
FIG. 2 is a section view of a torque transmission shaft employed in the first embodiment.
Figure 3:
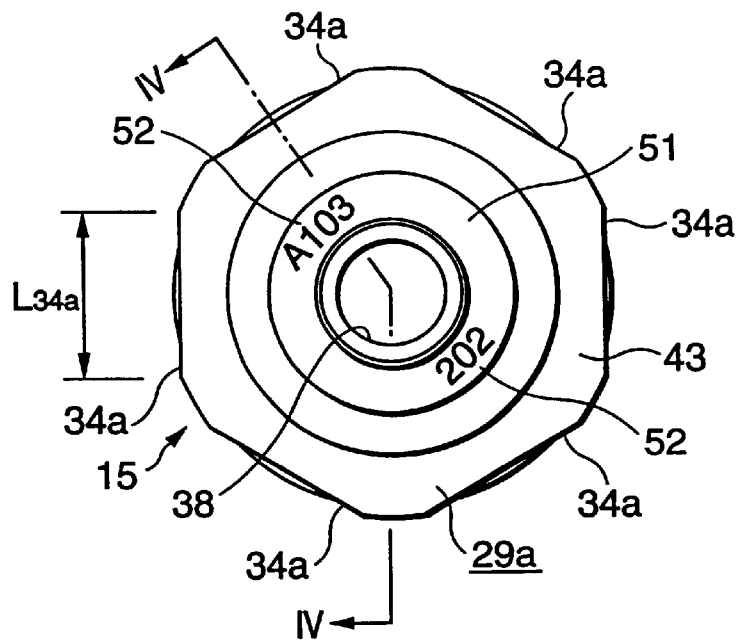
FIG. 3 is a view of the above torque transmission shaft, when it is viewed from the left side of FIG. 2.

Now, FIGS. 1 to 7 respectively show a first embodiment of a toroidal-type continuously variable transmission according to the invention. In particular, the invention is characterized in that a torque transmission shaft 15 functioning as a rotary shaft is improved in structure to thereby enhance the durability of the toroidal-type continuously variable transmission including the present torque transmission shaft 15. The operations and structures of the other portions of the first embodiment than the torque transmission shaft 15 are similar to the previously described conventional toroidal-type continuously variable transmission. Therefore, the duplicate description thereof is omitted or simplified here and description will be given below mainly of the characteristic portions of the invention as well as the different portions of the invention from the previously described conventional structure.

The end-face side half section (in FIGS. 1, 2 and 4, the left half section) of a flange portion 29a formed in one end portion of the torque transmission shaft 15 is used as a securing portion 43 having a hexagonal-cylindrical-shaped outer peripheral surface. To the securing portion 43, there can be secured a tool such as a box wrench, a spanner or the like when a loading nut 19 is threadedly engaged with a external thread portion 40 formed in the portion of the outer peripheral surface of the torque transmission shaft 15 located near the other end thereof and is further tightened with respect to the external thread portion 40. The securing portion 43 is composed of six flat surfaces 34a, 34a, which are respectively arranged in a equilaterally-hexagonal cylindrical shape and, in the tightly fastening operation, these six flat surfaces 34a, 34a, are able to support the tightly fastening torque of the loading nut 19 almost uniformly.

Figure 4:
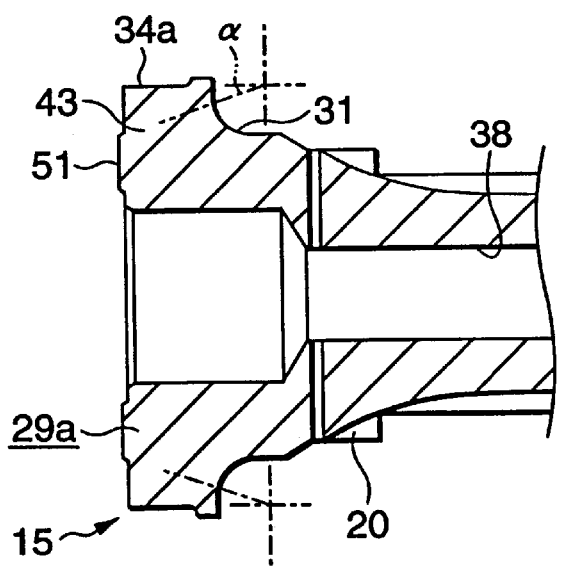
FIG. 4 is a section view taken along the arrow line IV—IV shown in FIG. 3.
Figure 5:
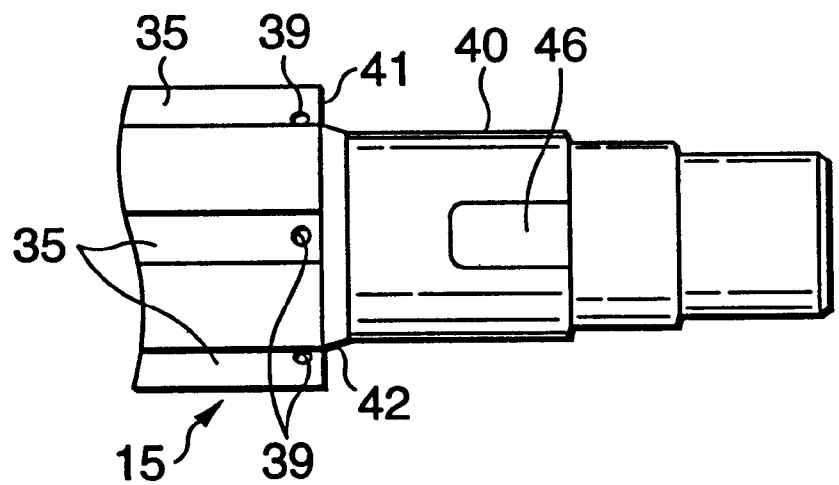
FIG. 5 is a section view taken along the arrow line B shown in FIG. 2.

Accordingly, since the six flat surfaces 34a, 34a, are able to support the above-mentioned tightly fastening torque sufficiently even if the respective lengths $L_{34a}$ of the six flat surfaces 34a, 34a, are not set especially large, the respective central portions of the six flat surfaces 34a, 34a, in the longitudinal direction thereof are not approached near the center axis of the flange portion 29a. Therefore, as shown in FIG. 4, a chained line α, which illustrates the operation line of a thrust load applied to the flange portion 29a through balls 33, 33, from a cam plate 9, is caused not to pass through a decreased thickness portion formed in the outer periphery of the end-face side half section (in FIG. 4, the left half section) of the flange portion 29a according as the six flat surfaces 34a, 34a, are formed. As a result of this, the rigidity of the torque transmission shaft 15 portion that supports the thrust load can be secured to thereby prevent damage such as crack or the like from occurring in the flange portion 29a, which makes it possible to secure the required durability of the torque transmission shaft 15 including the flange portion 29a. Also, the amount of elastic deformation of an inner race raceway 31, which is formed in the inner surface of the flange portion 29a, due to the above thrust load can be restrained to a minimum. Therefore, in spite of the present thrust load, the respective balls 33, 33, are prevented from moving up onto the shoulder portion of the inner race raceway 31 to thereby prevent edge loads from being applied to the rolling contact surfaces of these balls 33, 33, , which makes it possible to enhance the durability of a thrust ball bearing 30 including these balls 33, 33, —.

Figure 6:
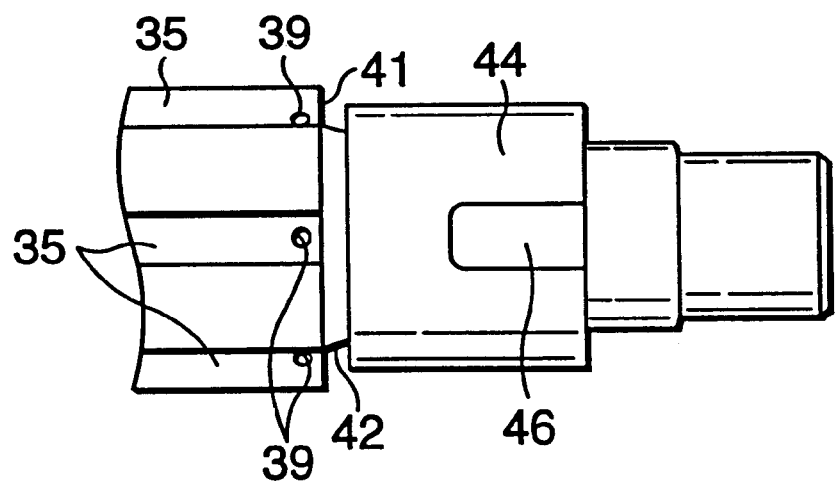
FIG. 6 is a section view similar to FIG. 5, showing a state of the torque transmission shaft before a external thread portion is formed therein.

Also, as described above, the external thread portion 40 is formed in the portion of the outer peripheral surface of the torque transmission shaft 15 located near the other end thereof (in FIGS. 1 and 2, the right side) for threaded engagement by the loading nut 19. In more particular, the present external thread portion 40 is formed in the following manner. That is, as shown in FIG. 6, in the portion of the torque transmission shaft 15 located near the other end thereof, there is formed a cylindrical portion 44 having a diameter larger than the outside diameter $D_{40}$ (in FIGS. 1 and 2) of the external thread portion 40, and the torque transmission shaft 15 including the cylindrical portion 44 is heat-carburized; and then, the surface of the thus carburized cylindrical portion 44 is cut off slightly. After then, the ridge portion of the external thread portion 40 is formed by an ordinary screw working method such as a lathe working method, a dies method or the like.

As described above, since, by shaving the surface of the cylindrical portion 44 slightly after the heat carburization treatment of the torque transmission shaft 15, the hardness of the surface of the cylindrical portion 44 can be lowered down (to the range of HRc 20–46), the ridge portion of the external thread portion 40 can be prevented against the delayed fracture thereof. As a result of this, the durability of the torque transmission shaft 15 including the external thread portion 40 can be secured. Also, no use of the anti-carburizing agent in order to restrain the hardness of the external thread portion 40 makes it possible to secure the surface hardness (of equal to or more than HRc 50) of the curved surface 42 having an arc-shaped cross section which adjoins the external thread portion 40 and allows the end portion of the external thread portion 40 and the inner peripheral edge of the stepped surface 41 to continue with each other. Therefore, in spite of the large tensile force applied to the curved surface 42 due to the thrust generated by the pressure device 8 when the toroidal-type continuously variable transmission is in operation, the curved surface 42 can be effectively prevented against damage. By the way, from the viewpoint of damage prevention of the curved surface 42, preferably, the radius of curvature of the cross section shape of the curved surface 42 may be set equal to or larger than 0.5 mm. Also, similarly, from the viewpoint of damage prevention of the curved surface 42 and stepped surface 41, preferably, they may be formed respectively as a flat surface, that is, the surface roughness of them may be set equal to or smaller than 25S.

Also, in the illustrated embodiment, in a portion of the circumferential direction end portion of the external thread portion 40, which projects toward the other end side of the torque transmission shaft 15 further beyond the loading nut 19, there is formed a recessed portion 46 which consists of a cylindrical-shaped recessed surface. In a state where the loading nut 19 is threadedly engaged with the external thread portion 40 and the inner end face of the loading nut 19 is contacted with the stepped surface 41, the loading nut 19 situated in the end portion of the recessed portion 46 is plastically deformed so as to bite into the recessed portion 46, thereby being able to prevent the loading nut 19 from loosening.

Also, the downstream ends of branch oil supply passages 39 and 39 are respectively opened to the bottom portions of outer-peripheral-surface side spline grooves 35 and 35 respectively formed in the outer periphery surface of the torque transmission shaft 15 located near the both end portions thereof in order to form two ball splines 17 and 17, whereby the outer-peripheral-surface side spline grooves 35 and 35 are allowed to communicate with an oil supply passage 38 which is formed in the central portion of the torque transmission shaft 15. In the present embodiment, the branch oil supply passages 39 and 39 are respectively disposed in the outer end portions of the outer-peripheral-surface side spline grooves 35 and 35 at such positions thereof that are not opposed to balls 37, 37 which respectively construct the ball splines 17 and 17. Such restriction of the forming positions of the respective branch oil supply passages 39 and 39 not only makes it possible to secure the cross-sectional area of the portion of the torque transmission shaft 15 where the outer-peripheral-surface side spline grooves 35 and 35 are formed, thereby being able to enhance the torsional rigidity of such portion, but also prevents stress from being concentrated in this portion to thereby be able to avoid a fear that there can occur damage such as crack or the like in the torque transmission shaft 15 at and from such portion thereof.

By the way, in securing the durability of the torque transmission shaft 15, preferably, the inside diameter of the oil supply passage 38 may be varied according to the outside diameter of the torque transmission shaft 15 to thereby set the thickness of the torque transmission shaft 15 in such a manner that it is as uniform as possible in the axial direction thereof. If the branch oil supply passages 39 and 39 are formed in the portion where the inside diameter of the oil supply passage 38 is large and the thickness of the torque transmission shaft 15 is relatively thin, then the forming operation of the branch oil supply passages 39 and 39 can be facilitated. Also, in the intermediate portion of the torque transmission shaft 15, besides the branch oil supply passages 39 and 39 which are used to supply oil to the ball splines 17 and 17, there are also formed branch oil supply passages 39a and 39a which are used to supply oil to not only rolling bearings 24 and 24 used to support a sleeve 25 but also needle roller bearings 48 and 48 used to support a pair of output-side disks 4 and 4 in the periphery of the torque transmission shaft 15 in a freely rotatable manner. The branch oil supply passages 39a and 39a are respectively interposed between two large-diameter portions 49 and 49 which are respectively formed in the intermediate portion of the torque transmission shaft 15, in order to construct the respective inner race raceways of the needle roller bearings 48 and 48 in the intermediate portion of the torque transmission shaft 15. Also, in the sleeve 25, there are formed through holes 50 and 50, so that lubrication oil discharged from the respective branch oil supply passages 39a and 39a to the inner peripheral surface side of the sleeve 25 can be freely supplied to the respective rolling bearings 24 and 24.

By the way, it is not always necessary to coincide the axial direction of the branch oil supply passages 39a and 39a with the axial direction of the through holes 50 and 50. For example, the through holes 50 and 50 may be formed in the portion that is opposed to the rolling bearings 24 and 24, and the branch oil supply passages 39a and 39a may be formed in the portion that is near the needle roller bearings 48 and 48. Now, while the torque transmission shaft 15 is heat-carburized for enhancement of the surface hardness thereof, after completion of such heat carburization treatment, a bending force is given to torque transmission shaft 15 to thereby correct the curvature thereof. Here, in order to prevent damage such as crack or the like from occurring in the torque transmission shaft 15 at and from the branch oil supply passages 39a and 39a in this curvature correcting operation, preferably, the forming operation of the branch oil supply passages 39 and 39 may be carried out after the curvature correcting operation. In addition, in order to reduce the curvature of the torque transmission shaft 15 in the heat treatment, it is possible that the heat treatment is performed while the torque transmission shaft 15 is subject to a tensile force.

Further, in the illustrated embodiment, in a portion of the outer end surface of the flange portion 29a, there is provided an elevated and annular projecting portion 51 which projects from the outer end face thereof, while the leading end face of the projecting portion 51 is used as a reference surface relating to the axial-direction dimension of the torque transmission shaft 15. By using the leading end face of the projecting portion 51 as the reference surface in this manner, the torque transmission shaft 15 can be controlled surely and the working operation of the torque transmission shaft 15 can be facilitated, thereby being able to reduce the cost of the torque transmission shaft 15. That is, as in the previously described conventional structure shown in FIGS. 12 to 15, if the outer end face of the flange portion 29 is formed flat and the whole surface of the outer end face is used as the reference surface, then a grinding operation for finishing the reference surface is troublesome, which results in the increased cost of the torque transmission shaft 15. Also, while there are given, on the above outer end face, marks 52, 52, —, which represent the lot number of the torque transmission shaft 15 and the like, there is a fear that the grinding operation makes the marks obscured or, in the worst case, makes them to vanish.

On the other hand, in the illustrated embodiment of the invention, since only the leading end face of the projecting portion 51 is ground, the time and labor necessary for the grinding operation can be reduced, which makes it possible to reduce the cost of the torque transmission shaft 15. Also, if the marks 52, 52, —are formed in the portion of the outer end face of the flange portion 29 that is shifted from the projecting portion 51, then there is no fear that the marks 52, 52, —can be obscured or vanished by the grinding operation.

The reference surface formed in the leading end face of the projecting portion 51 in the above-mentioned manner is used to measure a distance La between the stepped surface 41 consisting of a loading nut reference stepped surface, with which the inner end face of the loading nut 19 formed in the outer peripheral surface of the torque transmission shaft 15 located near the other end thereof is to be contacted, and the shoulder portion (the reference position of one raceway) of the inner race raceway 31. That is, the distance La plays an important role not only in restricting a distance between the pair of input-side disks 2 and 2 to a design value but also in allowing the toroidal-type continuously variable transmission to fulfill its expected performance. If the distance La is excessively large, then there comes short a preload which is given by belleville springs 21a and 21b, thereby causing slippage in the traction portions (the contact portions between the respective disks and power rollers) of the toroidal-type continuously variable transmission. On the other hand, if the distance La is excessively small, then the above preload becomes excessively large, which not only increases the resistance of the above traction portions but also lowers the durability of the respective parts of the toroidal-type continuously variable transmission.

Figure 7:
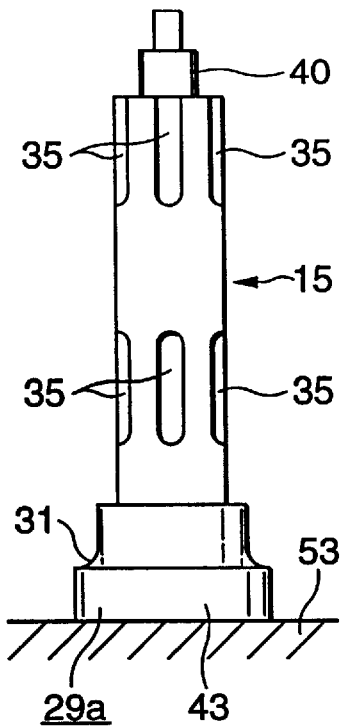
FIG. 7 is a schematically side view of the torque transmission shaft, showing a state thereof in which the dimension of the torque transmission shaft is measured.

To find the distance La using the above reference surface, as shown in FIG. 7, while the reference surface formed in the leading end face of the projecting portion 51 is butted against the upper surface of a surface plate 53, the torque transmission shaft 15 may be made to stand perpendicularly on the upper surface of the surface plate 53. And, there may be found a distance Lb between the upper surface of the surface plate 53 and the shoulder portion of the inner race raceway 31 as well as a distance Lc between the upper surface of the surface plate 53 and the stepped surface 41. Then, from a difference between the two distances Lb and Lc, there may be found the distance La between the stepped surface 41 and the shoulder portion of the inner race raceway 31. If the distance La is found in this manner, then the measuring operation can be facilitated and thus the time necessary for the measuring operation can also be shortened when compared with a case in which the distance La is obtained directly.

Figure 8:
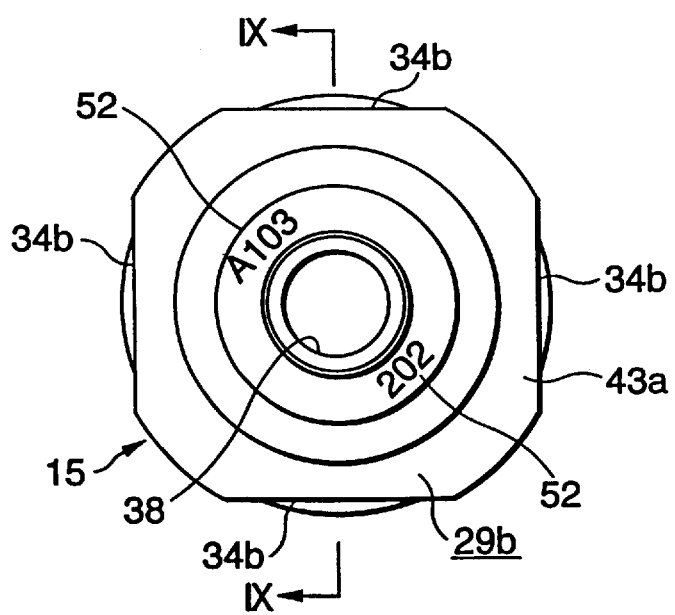
FIG. 8 is a view similar to FIG. 3, showing a second embodiment of a toroidal-type continuously variable transmission according to the invention.
Figure 9:
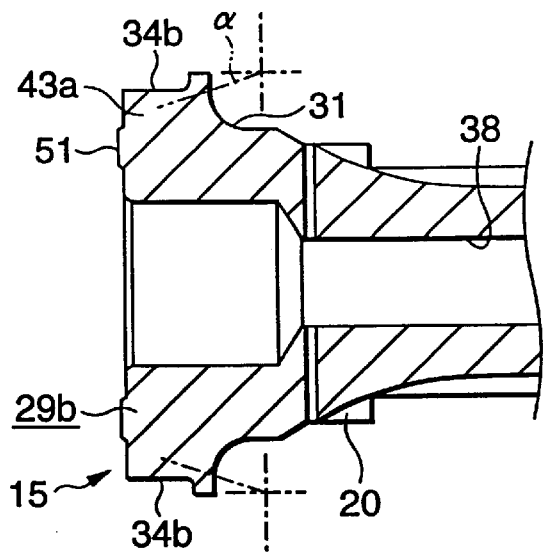
FIG. 9 is a section view taken along the line IX—IX shown in FIG. 8.
Figure 10:
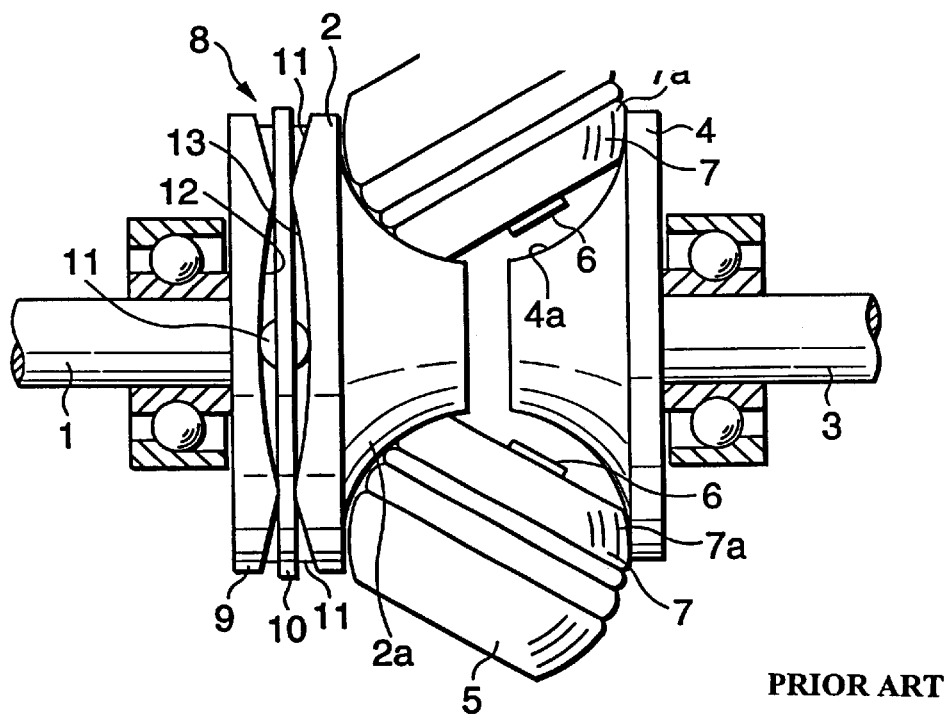
FIG. 10 is a side view of the basic structure of a toroidal-type continuously variable transmission, showing the maximum decelerating state thereof.
Figure 11:
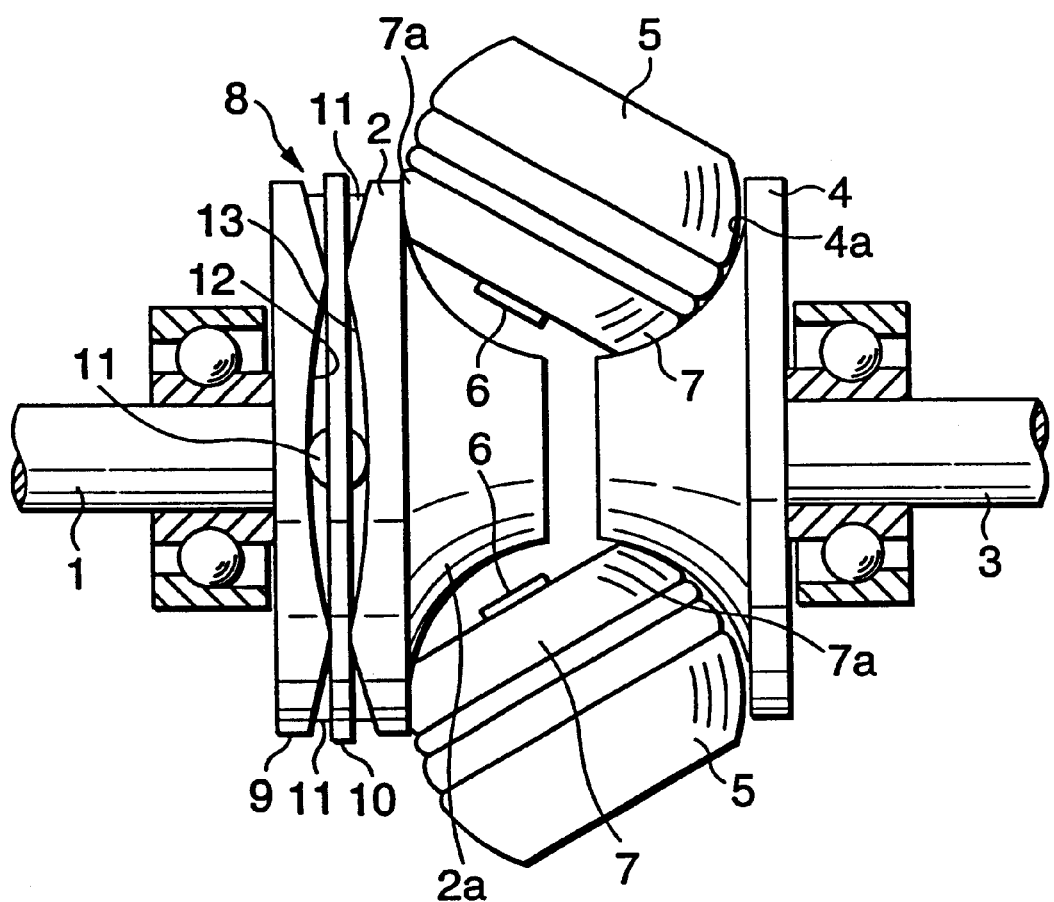
FIG. 11 is a side view of the basic structure of a toroidal-type continuously variable transmission, showing the maximum accelerating state thereof.
Figure 12:
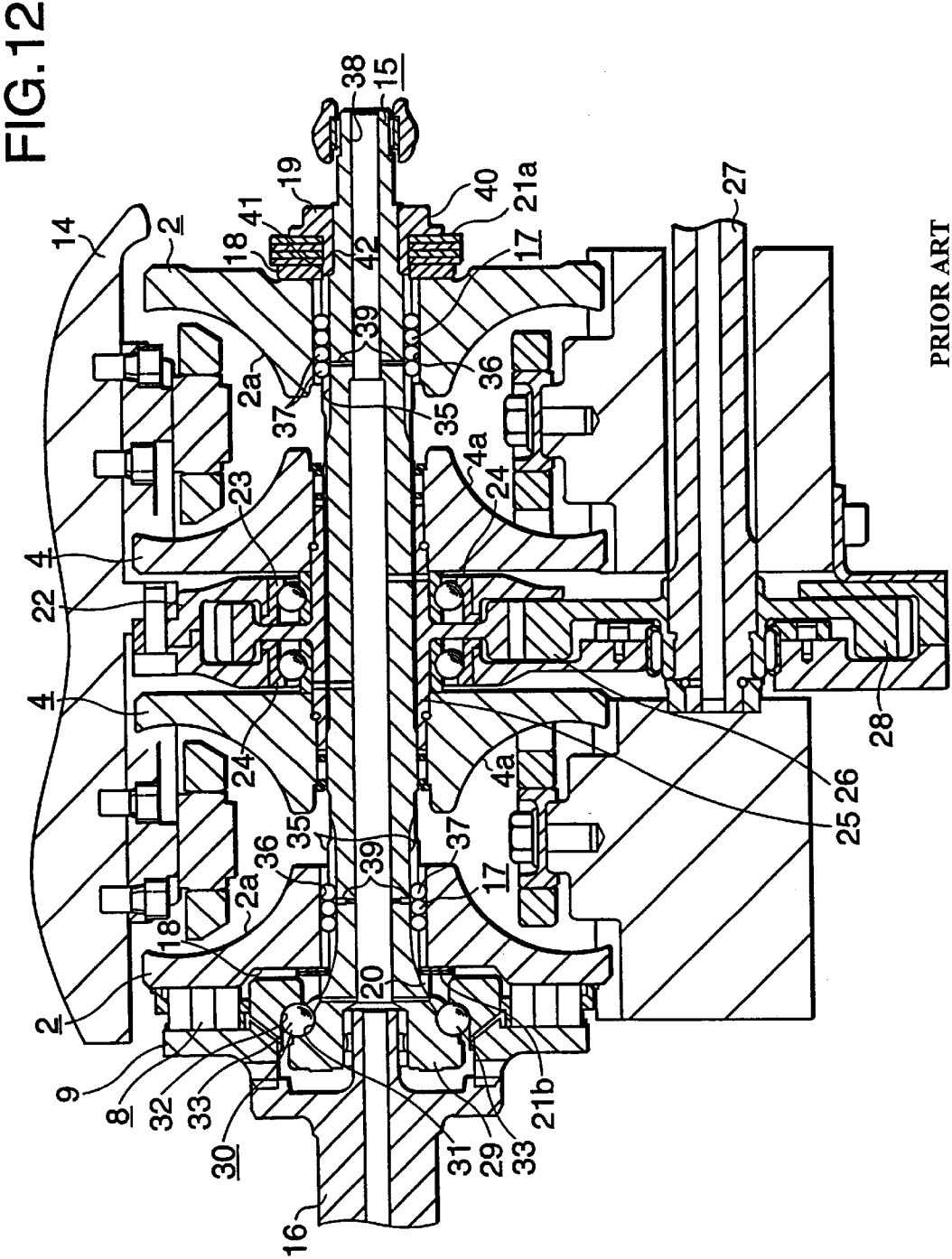
FIG. 12 is a section view of an example of the specific structure of a conventional toroidal-type continuously variable transmission.
Figure 13:
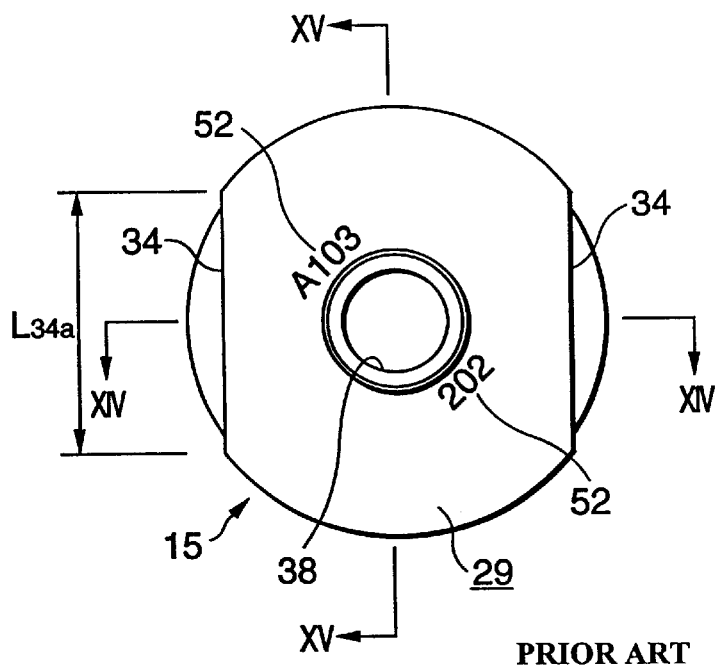
FIG. 13 is a view similar to FIG. 3, showing the conventional structure.
Figure 14:
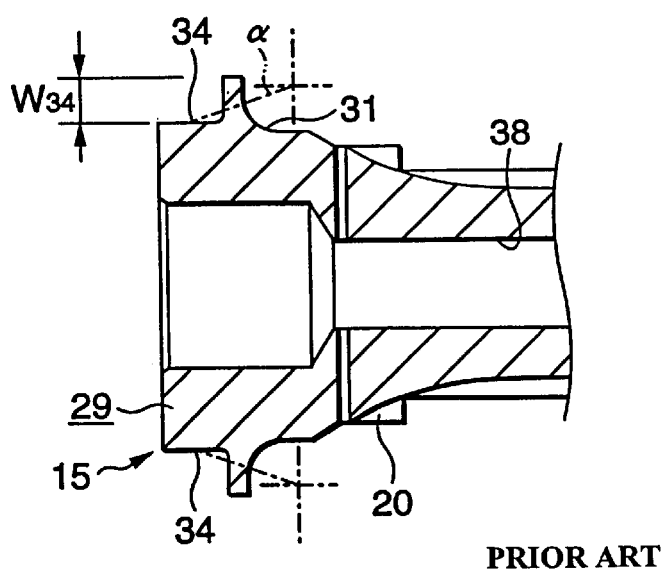
FIG. 14 is a section view taken along the line XIV—XIV shown in FIG. 13.
Figure 15:
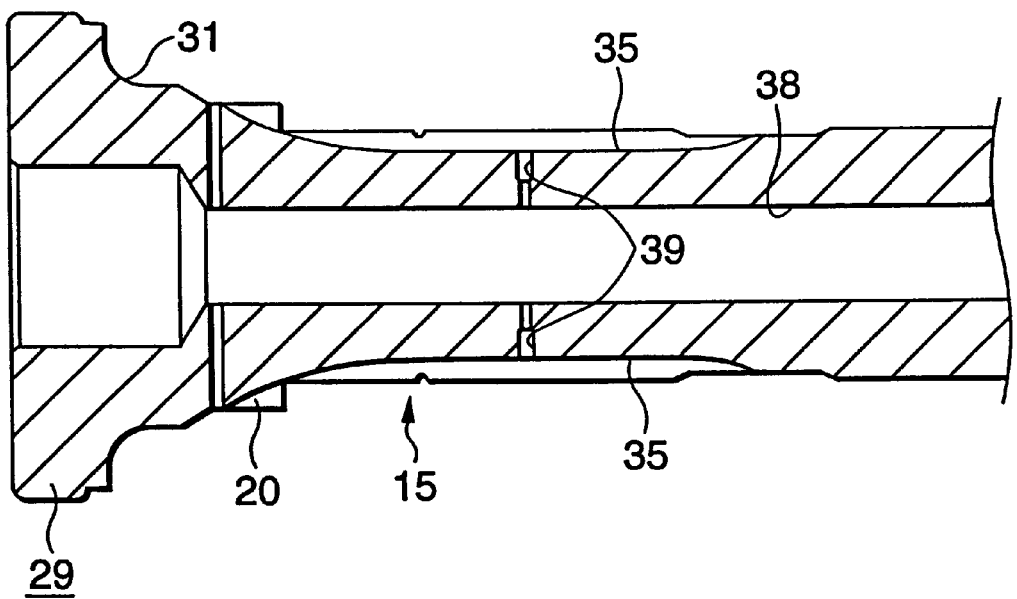
FIG. 15 is a section view taken along the line XV—XV shown in FIG. 13.

Next, FIGS. 8 and 9 respectively show a second embodiment of a toroidal-type continuously variable transmission according to the invention. In the present embodiment, a securing portion 43a, which is to be formed in the end-face side half section of a flange portion 29b, is composed of four flat surfaces 34b, 34b, —which are respectively arranged in a square cylindrical shape. According to the present embodiment as well, not only a chained line a representing the operation line of a thrust load applied to the flange portion 29b is made not to pass through the decreased thickness portion of the flange portion 29b to thereby be able to secure the durability of the torque transmission shaft 15 including the flange portion 29b, but also, in spite of the above thrust load, edge loads are prevented from being applied to the rolling contact surfaces of the balls 33, 33, —(FIG. 1) respectively forming the thrust ball bearing 30 to thereby be able to enhance the durability of the thrust ball bearing 30 including the balls 33, 33, —.

By the way, oil for cleaning and rust prevention is applied to the surface of the above-mentioned torque transmission shaft 15; and, as the oil of this type, preferably, there may be used a specified type of oil which, even if mixed into traction oil, will not deteriorate the traction oil. If such oil is used, then the trouble to wipe the oil adhered to the torque transmission shaft 15 can be omitted when assembling the torque transmission shaft 15 into the toroidal-type continuously variable transmission. Also, in the illustrated embodiments, there is shown a case in which the invention is applied to a toroidal-type continuously variable transmission of a so called double cavity type that the input-side and output-side disks 2 and 4 are respectively arranged by twos in parallel in the power transmission direction of the toroidal-type continuously variable transmission. However, the invention is not limited to such double cavity type of toroidal-type continuously variable transmission but can also be applied to a toroidal-type continuously variable transmission of a so called single cavity type that the input-side and output-side disks 2 and 4 are respectively arranged by one in the power transmission direction of the toroidal-type continuously variable transmission.

Since structured and operated in the above-mentioned manner, the present invention is able not only to enhance the durability of a rotary shaft thereof such as a torque transmission shaft or the like but also to enhance the durability of a toroidal-type continuously variable transmission which incorporates such rotary shaft therein.

The present invention relates to the subject matter contained in Japanese patent application No. Hei. 9-355548 filed on Dec. 24, 1997 which is expressly incorporated herein by reference in its entirety.

What is claimed is:

1. A toroidal-type continuously variable transmission, comprising:
    a rotary shaft;
    an input-side disk disposed on the periphery of said rotary shaft so as to be unrotatable with respect to said rotary shaft and shiftable in the axial direction of said rotary shaft, said input-side disk including an inside surface having a cross section formed in an arc-shaped concave surface;
    an output-side disk supported on said rotary shaft so as to be rotatable with respect to said rotary shaft and shiftable in the axial direction of said rotary shaft, output-side disk including an inside surface having a cross section formed in an arc-shaped concave surface;
    a flange portion integrally formed with said rotary shaft in one end portion of said rotary shaft;
    wherein, in a portion of an outer end face of said flange portion, there is formed a projecting portion which projects beyond said outer end face so that the leading end face of said projecting portion is used as a reference surface relating to the axial dimension of said rotary shaft;
    a loading nut threadedly engageable with a portion of said rotary shaft located near the other end portion, for restricting mutual shift between said rotary shaft and said input-side disk in the axial direction of said rotary shaft;
    a trunnion swingable about a pivot shaft situated at a torsional relation with respect to said rotary shaft;
    a plurality of power rollers respectively interposed between said input-side and output-side disks and supported rotatably on a displacement shaft supported by said trunnion, each of said power rollers including a peripheral surface formed in a spherical-shaped convex surface;
    an external thread portion formed on the outer peripheral surface of the portion of said rotary shaft located near the other end thereof, for threaded engagement with said loading nut;
    wherein said external thread portion is formed in such a manner that a cylindrical portion formed in said rotary shaft and having a larger diameter than the outside diameter of said external thread portion is heat-treated together with the remaining portions of said rotary shaft, the surface of said heat-treated cylindrical portion is cut slightly and, after then, an external thread is grooved;
    a cam plate rotatable together with said rotary shaft; a thrust ball bearing disposed in the portion of said rotary shaft located near the one end portion thereof and provided between said flange portion and said cam plate; and
    a pressure device interposed between said flange portion and said input-side disk, for pressing said input-side disk in a direction in which said input-side disk moves away from said cam plate along the axial direction of said rotary shaft.

2. A toroidal-type continuously variable transmission according to claim 1, wherein, in the outer peripheral surface of said rotary shaft located near the other end portion thereof, there is formed a loading nut reference stepped surface against which the inner end face of said loading nut is butted, and
    a distance between said loading nut reference stepped surface and the reference position of one of said raceways is obtained as a difference between a distance from said reference surface relating to the axial dimension of said rotary shaft formed in the outer end face of said flange portion to said loading nut reference stepped surface, and a distance from said reference surface relating to the axial dimension of said rotary shaft to said reference position of said one raceway.

3. A toroidal-type continuously variable transmission, comprising:
    a rotary shaft including a flange portion in one end portion thereof, and an external thread portion on the outer peripheral surface located near the other end portion thereof;
    an input-side disk disposed on the periphery of said rotary shaft so as to be unrotatable with respect to said rotary shaft and shiftable in the axial direction of said rotary shaft, said input-side disk including an inside surface having a cross section formed in an arc-shaped concave surface;
    an output-side disk supported on said rotary shaft so as to be rotatable with respect to said rotary shaft and shiftable in the axial direction of said rotary shaft, said output-side disk including an inside surface having a cross section formed in an arc-shaped concave surface;
    a loading nut threadedly engageable with a portion of said rotary shaft located near the other end portion, for restricting mutual shift between said rotary shaft and said input-side disk in the axial direction of said rotary shaft; torsional relation with respect to said rotary shaft;
    a trunnion swingable about a pivot shaft situated at a torsional relation with respect to said rotary shaft;
    a plurality of power rollers respectively interposed between said input-side and output-side disks and supported rotatably on a displacement shaft supported by said trunnion, each of said power rollers including a peripheral surface formed in a trunnion swingable about a pivot shaft situated at a spherical-shaped convex surface,
    wherein said external thread portion is formed in such a manner that a cylindrical portion formed in said rotary shaft and having a larger diameter than the outside diameter of said external thread portion is heat-treated together with the remaining portions of said rotary shaft, the surface of said heat-treated cylindrical portion is cut slightly and, after then, an external thread is grooved;
    a cam plate rotatable together with said rotary shaft;
    a thrust ball bearing disposed in the portion of said rotary shaft located near the one end portion thereof and provided between said flange portion and said cam plate;
    a pressure device interposed between said flange portion and said input-side disk, for pressing said input-side disk in a direction in which said input-side disk moves away from said cam plate along the axial direction of said rotary shaft; and wherein, in a portion of an outer end face of said flange portion, there is formed a projecting portion which projects beyond said outer end face so that the leading end face of said projecting portion is used as a reference surface relating to the axial dimension of said rotary shaft.

4. A toroidal-type continuously variable transmission according to claim 3, wherein, in the outer peripheral surface of said rotary shaft located near the other end portion thereof, there is formed a loading nut reference stepped surface against which the inner end face of said loading nut is butted, and a distance between said loading nut reference stepped surface and the reference position of one of said raceways is obtained as a difference between a distance from said reference surface relating to the axial dimension of said rotary shaft formed in the outer end face of said flange portion to said loading nut reference stepped surface, and a distance from said reference surface relating to the axial dimension of said rotary shaft to said reference position of said one raceway.

5. A toroidal-type continuously variable transmission, comprising:

a rotary shaft;

an input-side disk disposed on the periphery of said rotary shaft so as to be unrotatable with respect to said rotary shaft and shiftable in the axial direction of said rotary shaft, said input-side disk including an inside surface having a cross section formed in an arc-shaped concave surface;

an output-side disk supported on said rotary shaft so as to be rotatable with respect to said rotary shaft and shiftable in the axial direction of said rotary shaft, said output-side disk including an inside surface having a cross section formed in an arc-shaped concave surface;

a flange portion integrally formed with said rotary shaft in one end portion of said rotary shaft;

a loading nut threadedly engageable with a portion of said rotary shaft located near the other end portion, for restricting mutual shift between said rotary shaft and said input-side disk in the axial direction of said rotary shaft;

a trunnion swingable about a pivot shaft situated at a torsional relation with respect to said rotary shaft;

a plurality of power rollers respectively interposed between said input-side and output-side disks and supported rotatably on a displacement shaft supported by said trunnion, each of said power rollers including a peripheral surface formed in a spherical-shaped convex surface;

an external thread portion formed on the outer peripheral surface of the portion of said rotary shaft located near the other end thereof, for threaded engagement with said loading nut;

a continuous portion formed in said rotary shaft adjacent to said external thread portion at one end of said continuous portion, said continuous portion defining a beginning of a step portion at the other end of said continuous portion opposite to said one end of said continuous portion, wherein said external thread portion is formed in such a manner that a cylindrical portion formed in said rotary shaft and having a larger diameter than the outside diameter of said external thread portion is heat-treated together with the remaining portions of said rotary shaft, the surface of said heat-treated cylindrical portion is cut slightly and, after then, an external thread is grooved, wherein said loading nut engages with said external threaded portion and extends over said continuous portion; and wherein said continuous portion has a hardness of HRC 50 or more, and said external thread portion has a hardness of HRC 20–46.

6. A toroidal-type continuously variable transmission, comprising:

a rotary shaft including a flange portion in one end portion thereof, and an external thread portion on the outer peripheral surface located near the other end portion thereof;

an input-side disk disposed on the periphery of said rotary shaft so as to be unrotatable with respect to said rotary shaft and shiftable in the axial direction of said rotary shaft, said input-side disk including an inside surface having a cross section formed in an arc-shaped concave surface;

an output-side disk supported on said rotary shaft so as to be rotatable with respect to said rotary shaft and shiftable in the axial direction of said rotary shaft, said output-side disk including an inside surface having a cross section formed in an arc-shaped concave surface;

a loading nut threadedly engageable with a portion of said rotary shaft located near the other end portion, for restricting mutual shift between said rotary shaft and said input-side disk in the axial direction of said rotary shaft;

a trunnion swingable about a pivot shaft situated at a torsional relation with respect to said rotary shaft; and, a plurality of power rollers respectively interposed between said input-side and output-side disks and supported rotatably on a displacement shaft supported by said trunnion, each of said power rollers including a peripheral surface formed in a spherical-shaped convex surface;

a continuous portion formed in said rotary shaft adjacent to said external thread portion at one end of said continuous portion, said continuous portion defining a beginning of a step portion at the other end of said continuous portion opposite to said one end of said continuous portion, wherein said external thread portion is formed in such a manner that a cylindrical portion formed in said rotary shaft and having a larger diameter than the outside diameter of said external thread portion is heat-treated together with the remaining portions of said rotary shaft, the surface of said heat-treated cylindrical portion is cut slightly and, after then, an external thread is grooved;

wherein said loading nut engages with said external threaded portion and extends over said continuous portion; and wherein said continuous portion has a hardness of HRC 50 or more, and said external thread portion has a hardness of NRC 20–46.

7. A toroidal-type continuously variable transmission, comprising:

a rotary shaft;

an input-side disk disposed on the periphery of said rotary shaft so as to be unrotatable with respect to said rotary shaft and shiftable in the axial direction of said rotary shaft, said input-side disk including an inside surface having a cross section formed in an arc-shaped concave surface;

an output-side disk supported on said rotary shaft so as to be rotatable with respect to said rotary shaft and shiftable in the axial direction of said rotary shaft, said output-side disk including an inside surface having a cross section formed in an arc-shaped concave surface;

a flange portion integrally formed with said rotary shaft in one end portion of said rotary shaft;

a loading nut threadedly engageable with a portion of said rotary shaft located near the other end portion, for restricting mutual shift between said rotary shaft and said input-side disk in the axial direction of said rotary shaft;

a trunnion swingable about a pivot shaft situated at a torsional relation with respect to said rotary shaft;

a plurality of power rollers respectively interposed between said input-side and output-side disks and supported rotatably on a displacement shaft supported by said trunnion, each of said power rollers including a peripheral surface formed in a spherical-shaped convex surface;

an external thread portion formed on the outer peripheral surface of the portion of said rotary shaft located near the other end thereof, for threaded engagement with said loading nut;

a continuous portion formed in said rotary shaft adjacent to said external thread portion at one end of said continuous portion, said continuous portion defining a beginning of a step portion at the other end of said continuous portion opposite to said one end of said continuous portion, wherein said external thread portion is formed in such a manner that a cylindrical portion formed in said rotary shaft and having a larger diameter than the outside diameter of said external thread portion is heat-treated together with the remaining portions of said rotary shaft, the surface of said heat-treated cylindrical portion is cut slightly and, after then, an external thread is grooved, wherein said loading nut engages with said external threaded portion and extends over said continuous portion; and wherein said continuous portion has a hardness greater than said threaded portion.

8. A toroidal-type continuously variable transmission, comprising:

a rotary shaft including a flange portion in one end portion thereof, and an external thread portion on the outer peripheral surface located near the other end portion thereof;

an input-side disk disposed on the periphery of said rotary shaft so as to be unrotatable with respect to said rotary shaft and shiftable in the axial direction of said rotary shaft, said input-side disk including an inside surface having a cross section formed in an arc-shaped concave surface;

an output-side disk supported on said rotary shaft so as to be rotatable with respect to said rotary shaft and shiftable in the axial direction of said rotary shaft, said output-side disk including an inside surface having a cross section formed in an arc-shaped concave surface;

a loading nut threadedly engageable with a portion of said rotary shaft located near the other end portion, for restricting mutual shift between said rotary shaft and said input-side disk in the axial direction of said rotary shaft;

a trunnion swingable about a pivot shaft situated at a torsional relation with respect to said rotary shaft; and, a plurality of power rollers respectively interposed between said input-side and output-side disks and supported rotatably on a displacement shaft supported by said trunnion, each of said power rollers including a peripheral surface formed in a spherical-shaped convex surface;

a continuous portion formed in said rotary shaft adjacent to said external thread portion at one end of said continuous portion, said continuous portion defining a beginning of a step portion at the other end of said continuous portion opposite to said one end of said continuous portion, wherein said external thread portion is formed in such a manner that a cylindrical portion formed in said rotary shaft and having a larger diameter than the outside diameter of said external thread portion is heat-treated together with the remaining portions of said rotary shaft, the surface of said heat-treated cylindrical portion is cut slightly and, after then, an external thread is grooved;

wherein said loading nut engages with said external threaded portion and extends over said continuous portion; and wherein said continuous portion has a hardness greater than said threaded portion.

* * * * *